US006147792A

United States Patent [19]

Jones et al.

[11] Patent Number: 6,147,792

[45] Date of Patent: Nov. 14, 2000

[54] LIGHT MODULATING DEVICES

[75] Inventors: John Clifford Jones, Leigh Sinton; Alistair Graham, Powick, both of United Kingdom; Michiyuki Sugino; Takaji Numao, both of Kashiwa, Japan

[73] Assignees: Sharp Kabushiki Kaisha, Osaka, Japan; The Secretary of State for Defence in Her Britannic Majesty's Government of the United Kingdom of Great Britain and Northern Ireland, Farnborough, United Kingdom

[21] Appl. No.: 09/302,143

[22] Filed: Apr. 29, 1999

[30] Foreign Application Priority Data

Apr. 29, 1998 [GB] United Kingdom .................. 9809095

[51] Int. Cl.[7] .............................. G02F 1/29; G09G 3/18; G09G 3/36

[52] U.S. Cl. ............................. 359/320; 345/51; 345/97; 345/93; 345/89; 349/173; 358/457; 359/238; 359/316

[58] Field of Search ................................ 345/97, 89, 90, 345/93, 51; 349/173; 358/457; 359/316, 320, 238

[56] References Cited

U.S. PATENT DOCUMENTS

| | | | |
|---|---|---|---|
| 4,827,352 | 5/1989 | Yoneda et al. | 358/287 |
| 4,937,682 | 6/1990 | Dalton | 358/461 |
| 5,282,057 | 1/1994 | Mailloux et al. | 358/445 |
| 5,389,948 | 2/1995 | Liu | 345/147 |
| 5,410,615 | 4/1995 | Mailloux | 382/47 |
| 5,999,242 | 5/1989 | Walton et al. | 349/148 |

FOREIGN PATENT DOCUMENTS

| | | |
|---|---|---|
| 0261901 | 3/1988 | European Pat. Off. . |
| 0402130 | 12/1990 | European Pat. Off. . |
| 0526045 | 2/1993 | European Pat. Off. . |
| 0838799 | 4/1998 | European Pat. Off. . |
| 0 848 369 A2 | 6/1998 | European Pat. Off. . |
| 2318248 | 4/1998 | United Kingdom . |
| 2320357 | 6/1998 | United Kingdom . |
| 9409473 | 4/1994 | WIPO . |

OTHER PUBLICATIONS

Search Report for GB Application 9809095.4; Dated Jul. 27, 1998.

European Search Report, Application No. 99302946.1, dated Jul. 9, 1999.

*Primary Examiner*—Georgia Epps
*Assistant Examiner*—Evelyn A. Lester
*Attorney, Agent, or Firm*—Renner, Otto Boisselle & Sklar LLP

[57] ABSTRACT

A light modulating device, such as a ferroelectric liquid crystal display (FLCD) comprises an addressable matrix and modulating elements or pixels and associated circuitry for selectively addressing each element in a series of addressing frames in order to vary the transmission level of each element relative to the transmissions levels of the other elements. Such addressing utilises a temporal dither addressing scheme for addressing at least part of each element within each frame with different combinations of temporal dither signals applied to separately addressable temporal bits within the frame to produce different transmission levels. In order to enable a large number of grey levels to be produced whilst limiting the perceived errors at transitions between different grey levels, the temporal bits are addressed in a first order in a first frame (or in a first spatial location) and in a second order, which is different to the first order, in a second frame (or in a second spatial location). The order in which the temporal bits are addressed may be varied according to a prescribed sequence, for example alternating between successive frames, along each line or between corresponding frames on adjacent lines.

11 Claims, 7 Drawing Sheets

| 4 | 2 | 1 | Total |
|---|---|---|---|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

FIG. 6

```
A        3            3            3    1    4             4            4        4

B   1..2....4....  ;1..2....4....  ;1.. 2.....4....;1..2....4....;1. .2....4.....;1..2....4....  ;1.. 2
C   1 1 1 0 0 0 0; 1 1 1 0 0 0 0;1 1 1 0 0 0 0;0 0 0 1 1 1 1;0 0 0 1 1 1 1;0 0 0 1 1 1 1;0 0 0
D                3; 3 3 3 3 3 3 3;3 3 3 3 3 3 3;2 1 0 1 2 3 4;4 4 4 4 4 4 4;4 4 4 4 4 4 4;4 4 4
E                ;.   100       ;     100     ;      46     ;     100     ;     100     ;
```

FIG. 7

```
A        3            3            3    1    4             4            4        4
    line n:
B   1..2....4....  ;....4.....2..1;1. . 2.....4....;....4....2..1;1. . 2....4.....;.....4....2..1;1.. 2
C   1 1 1 0 0 0 0; 0 0 0 0 1 1 1;1 1 1 0 0 0 0;1 1 1 1 0 0 0;0 0 0 1 1 1 1;1 1 1 1 0 0 0;0 0 0
D                3; 2 1 0 0 1 2 3;4 5 6 6 5 4 3;3 3 3 4 4 4 4;3 2 1 1 2 3 4;5 6 7 7 6 5 4;3 2 1
E                ;      43     ;     157     ;      89     ;      57     ;      143     ;

    lines n+1 and n-1:
B   ...4.....2..1;1. . 2.....4....;....4....2..1;1. . 2....4.....;.....4....2..1;1..2....4....;...4.
C   0 0 0 0 1 1 1;1 1 1 0 0 0 0;0 0 0 0 1 1 1;0 0 0 1 1 1 1;1 1 1 1 0 0 0;0 0 0 1 1 1 1;1 1 1
D                3;4 5 6 6 5 4 3;2 1 0 0 1 2 3;3 3 3 4 4 4 4;5 6 7 7 6 5 4;3 2 1 1 2 3 4;5 6 7
E                ;     157     ;      43     ;      89     ;     143     ;      57     ;

    Averaging over the lines gives the sequence:
F                3;3 3 3 3 3 3 3;3 3 3 3 3 3 3;3 3 3 4 4 4 4;4 4 4 4 4 4 4;4 4 4 4 4 4 4;4 4 4
```

FIG. 8

```
A        3          3          3   I   4          4          4       4
    line n:
B   1....4.....2.;..2.....4....1;1....4.....2.;..2.....4....1;1....4.....2.;..2.....4....1;1....4.
C   1 0 0 0 0 1 1;1 1 0 0 0 0 1;1 0 0 0 0 1 1;0 0 1 1 1 1 0;0 1 1 1 1 0 0;0 0 1 1 1 1 0;0 1 1
D            3;3 4 4 4 4 3 3;3 2 2 2 2 3 3;2 2 3 4 5 5 4;4 5 5 5 5 4 4;4 3 3 3 3 4 4;4 5 5
E             ;    119     ;     81     ;     89     ;    114     ;     86     ;

    line n+1:
B   ..2.....4....1;1....4.....2.;..2.....4....1;1....4.....2.;..2.....4....1;1....4.....2.;..2....
C    1 1 0 0 0 0 1;1 0 0 0 0 1 1;1 1 0 0 0 0 1;0 1 1 1 1 0 0;0 0 1 1 1 1 0;0 1 1 1 1 0 0;0 0 1
D             3;3 2 2 2 2 3 3;3 4 4 4 4 3 3;2 2 3 4 5 5 4;4 3 3 3 3 4 4;4 5 5 5 5 4 4;4 3 3
E              ;     81     ;    119     ;     89     ;     86    ;    114     ;

    Averaging over the two lines gives:
F            3;3 3 3 3 3 3 3;3 3 3 3 3 3 3;2 2 3 4 5 5 4;4 4 4 4 4 4 4;4 4 4 4 4 4 4;4 4 4

G             3  3  2.9  2.7  2.7  2.9  3.1 3.4  3.6  3.9  4.1  4.3  4.3  4.1  4  4  4
```

FIG. 9

```
    line n:
A        3          3          3   I   4          4          4       4
B   1..2....4....  ;....4.....2..1;1.. 2.....4....;....4....2..1;1.. 2....4.....;.....4....2..1;1.. 2
C   1 1 1 0 0 0 0;0 0 0 0 1 1 1;1 1 1 0 0 0 0;1 1 1 1 0 0 0;0 0 0 1 1 1 1;1 1 1 1 0 0 0;0 0 0
D             3; 2 1 0 0 1 2 3;4 5 6 6 5 4 3;3 3 3 4 4 4 4;3 2 1 1 2 3 4;5 6 7 7 6 5 4;3 2 1
E              ;     43     ;    157     ;     89     ;     57     ;    143     ;

    lines n+1 and n-1:
A        4          4          4          3          3          3       3
B   ...4.....2..1;1. . 2.....4....;....4....2..1;1. , 2....4.....;.....4....2..1;1..2....4....;...4.
C   1 1 1 1 0 0 0;0 0 0 1 1 1 1;1 1 1 1 0 0 0;1 1 1 0 0 0 0;0 0 0 0 1 1 1;1 1 1 0 0 0 0;0 0 0
D             4;3 2 1 1 2 3 4;5 6 7 7 6 5 4;4 4 4 3 3 3 3;2 1 0 0 1 2 3;4 5 6 6 5 4 3;2 1 0
E              ;     57     ;    143     ;    114     ;     43     ;    143     ;
```

FIG. 10

| | | | | |
|---|---|---|---|---|
| 1 2 4 | 1 2 4 | 1 2 4 | 1 2 4 | ---- |
| 4 2 1 | 4 2 1 | 4 2 1 | 4 2 1 | ---- |

FIG. 11

| | | | | | |
|---|---|---|---|---|---|
| 1 2 4 | 4 2 1 | 4 2 1 | 1 2 4 | 1 2 4 | ---- |
| 1 2 4 | 1 2 4 | 4 2 1 | 1 2 4 | 4 2 1 | ---- |

FIG. 12

| | SD | frame 1 | | | | frame 2 | | | | . . . . . |
|---|---|---|---|---|---|---|---|---|---|---|
| Line 1 | 1: | TD 1 | 4 | 16 | 64 | 16 | 64 | 4 | 1 | |
| | 2: | 1 (=2) | 4 (=8) | 16 (=32) | 64 (=128) | 16 | 64 | 4 | 1 | |
| | | | | | | | | | | |
| Line 2 | 1: | 64 | 1 | 4 | 16 | 1 | 16 | 64 | 4 | |
| | 2: | 64 | 1 | 4 | 16 | 1 | 16 | 64 | 4 | |

FIG. 13

| | SD | frame 1 | | | | frame 2 | | | | |
|---|---|---|---|---|---|---|---|---|---|---|
| Line 1 | 1: | 1 | 4 | 16 | 64 | 64 | 4 | 1 | 16 | . . . . . |
| | 2: | 16 | 64 | 4 | 1 | 4 | 16 | 1 | 64 | . . . . . |
| | | | | | | | | | | |
| Line 2 | 1: | 64 | 1 | 4 | 16 | 1 | 16 | 4 | 64 | |
| | 2: | 1 | 16 | 4 | 64 | 64 | 1 | 6 | 4 | |

FIG. 14

LIGHT MODULATING DEVICES

This invention relates to light modulating devices, and is concerned more particularly, but not exclusively, with liquid crystal display and optical shutter devices including spatial light modulators.

It should be understood that the term "light modulating devices" is used in this specification to encompass both light transmissive modulators, such as diffractive spatial modulators, or conventional liquid crystals displays, light emissive modulators, such as electroluminescent or plasma displays, reflective or transflective devices or displays, and other spatial light modulators, such as optically addressed spatial light modulators or plasma addressed spatial light modulators.

Liquid crystal devices are commonly used for displaying alphanumeric information and/or graphic images. Furthermore liquid crystal devices are also used as optical shutters, for example in printers. Such liquid crystal devices comprise a matrix of individually addressable modulating elements which can be designed to produce not only black and white, but also intermediate transmissive levels or "greys". Also, in colour devices, such as those employing colour filters, the intermediate levels may be used to give a wider variety of colours or hues. The so-called grey-scale response of such a device may be produced in a number of ways.

For example, the grey-scale response may be produced by modulating the transmission of each element between "on" and "off" states in dependence on the applied drive signal so as to provide different levels of analogue grey. In a twisted nematic device, for example, the transmission of each element may be determined by an applied RMS voltage and different levels of grey may be produced by suitable control of the voltage. In active matrix devices the voltage stored at the picture element similarly controls the grey level. On the other hand, it is more difficult to control the transmission in an analogue fashion in a bistable liquid crystal device, such as a ferroelectric liquid crystal device, although various methods have been reported by which the transmission may be controlled by modulating the voltage signal in such a device. In devices having no analogue greyscale, a greyscale response may be produced by so-called spatial or temporal dither techniques, or such techniques may be used to augment the analogue greyscale.

In a spatial dither (SD) technique each element is divided into two or more separately addressable subelements which are addressable by different combinations of switching signals in order to produce different overall levels of grey. For example, in the simple case of an element comprising two equal sized subelements each of which is switchable between a white state and a black state, three grey levels (including white and black) will be obtainable corresponding to both subelements being switched to the white state, both sub-elements being switched to the black state, and one subelement being in the white state while the other subelement is in the black state. Since both subelements are of the same size, the same grey level will be obtained regardless of which of the subelements is in the white state and which is in the black state, so that the switching circuit must be designed to take account of this level of redundancy. It is also possible for the subelements to be of different sizes so as to constitute two or more spatial bits of different significance, which will have the effect that different grey levels will be produced depending on which of the two subelements is in the white state and which is in the black state. However a limit to the number of subelements which can be provided in practice is imposed by the fact that separate conductive tracks are required for supplying the switching signals to the subelements and the number of such tracks which can be accommodated is limited by space constraints, cost, fill factor or aperture ratio and the like.

In a temporal dither (TD) technique at least part of each element is addressable by different time modulated signals in order to produce different overall levels of grey within the addressing frame. For example, in a simple case in which an element is addressable within the frame by two subframes of equal duration, the element may be arranged to be in the white state when it is addressed so as to be "on" in both subframes, and the element may be arranged to be in the dark state when it is addressed so as to be "off" in both subframes. Furthermore the element may be in an intermediate grey state when it is addressed so as to be "on" in one subframe and "off" in the other subframe. Alternatively the subframes may be of different durations so as to constitute two or more temporal bits of different significance. Furthermore it is possible to combine such a temporal dither technique with spatial dither by addressing one or more of the subelements in a spatial dither arrangement by different time modulated signals. This allows an increased range of grey levels to be produced at the cost of increased circuit complexity.

In many applications, and particularly in display devices for displaying moving graphic images, there is a requirement for a large number of suitably spaced grey levels to be generated, with minimum (preferably no) redundancy of grey levels. Usually the grey levels are linearly spaced as far as possible. To this end it has been proposed that the elements should be binary weighted, for example by dividing each element into three subelements having surface areas in the ratio 4:2:1 in a 3-bit SD arrangement. In this case, assuming that each sub-element is separately switchable between a black state corresponding to a unit grey level of 0 and a white state corresponding to a unit grey level of 1, and that the total grey level is given by adding together the grey levels of the three subelements with the appropriate binary weighting, 8 different grey levels without redundancy are obtainable by addressing of the three subelements concurrently as shown in FIG. 6. European Patent Publication No. 0453033A1 discloses a display device of this type. Alternatively the elements may be binary weighted, by addressing each element in subframes of different durations, for example durations in the ratio 1:4, in a 2-bit TD technique. European Patent Publication No. 0261901A2 discloses a method of maximising the number of grey levels that can be obtained from a certain number of binary temporal divisions of the addressing frame. W. J. A. M. Hartmann, "Ferroelectric liquid crystal displays for television application", Ferroelectrics 1991, Vol. 122, pp. 126, discloses certain optimum combinations of SD and TD ratios for use in ferroelectric liquid crystal display devices to obtain a large number of spaced grey levels.

However errors can be perceived at the transitions between different grey levels when such SD and TD addressing arrangements are used, particularly at transitions involving a change in the state of the most significant bit. The effect of such errors is particularly noticeable when a large area of one grey level sweeps over an area of another grey level in which case the errors will give rise to a distinct edge of lower intensity. The human eye and brain are particularly receptive to edges, so that this effect may be perceivable even when the errors occur only over fractions of a frame time.

It is an object of the invention to provide a light modulating device with means for enabling a large number of grey levels to be produced in such a manner as to limit the perceived errors at transitions between different grey levels.

The invention is defined by the accompanying claims.

In order that the invention may be more fully understood, a number of different embodiments in accordance with the invention will now be described, by way of example, with reference to the accompanying drawings, in which.

Figure 3:
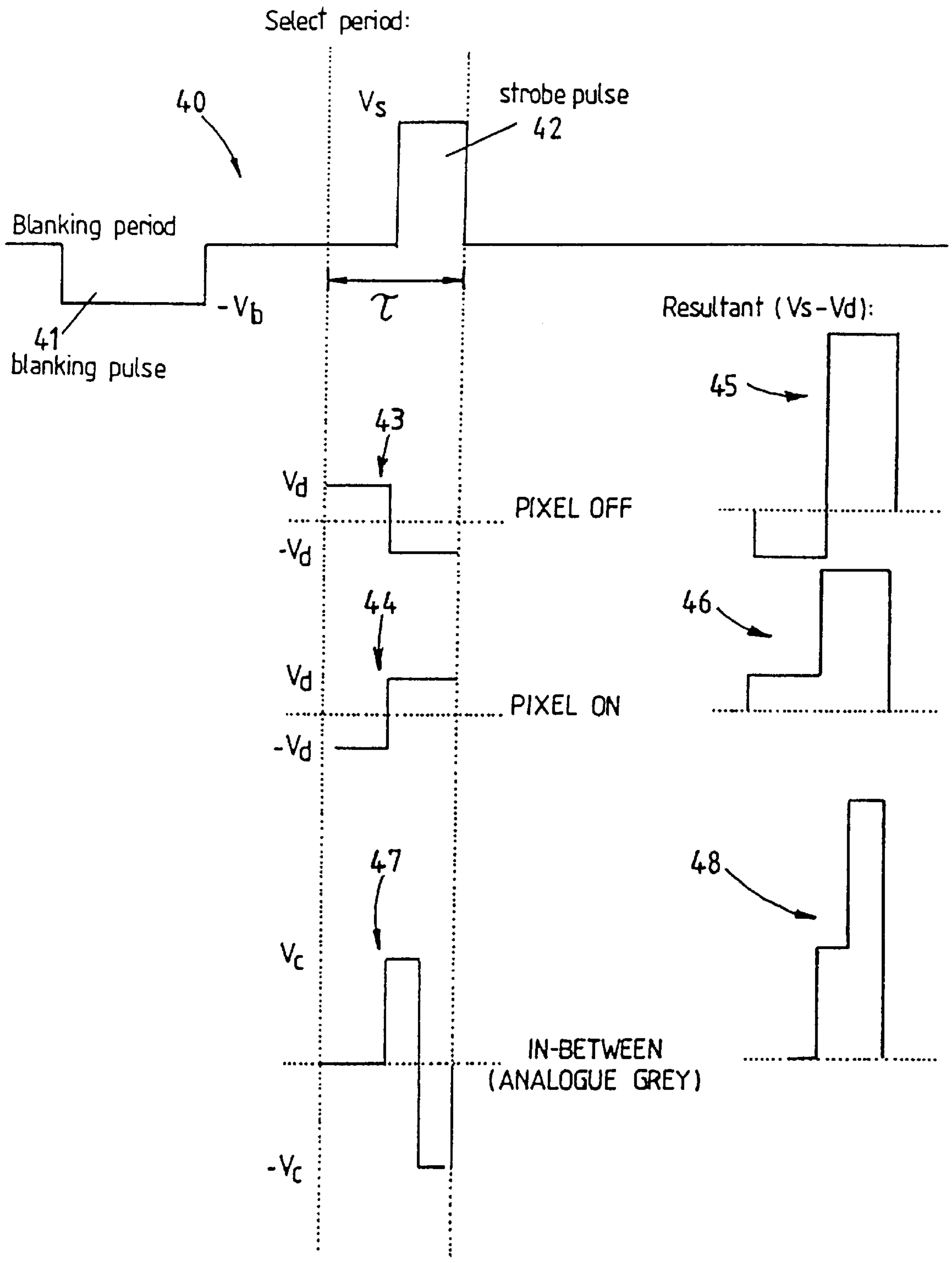
Figure 4:
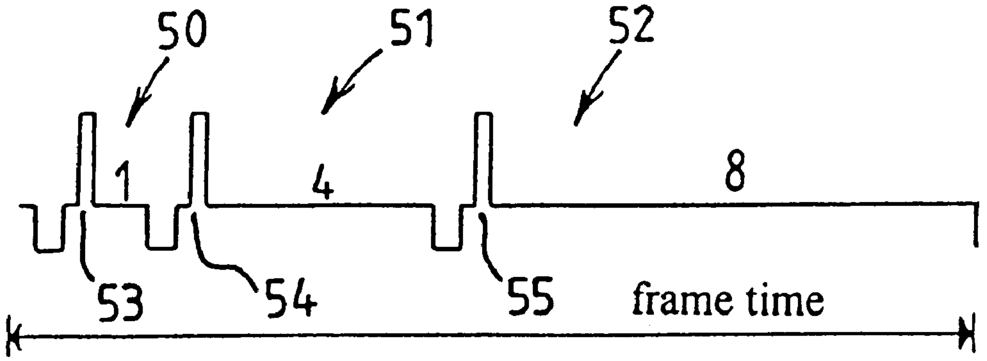
Figure 5:
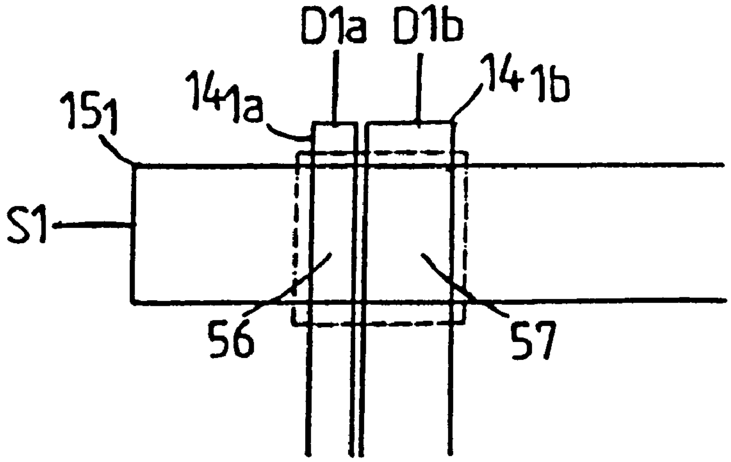
Figure 15:
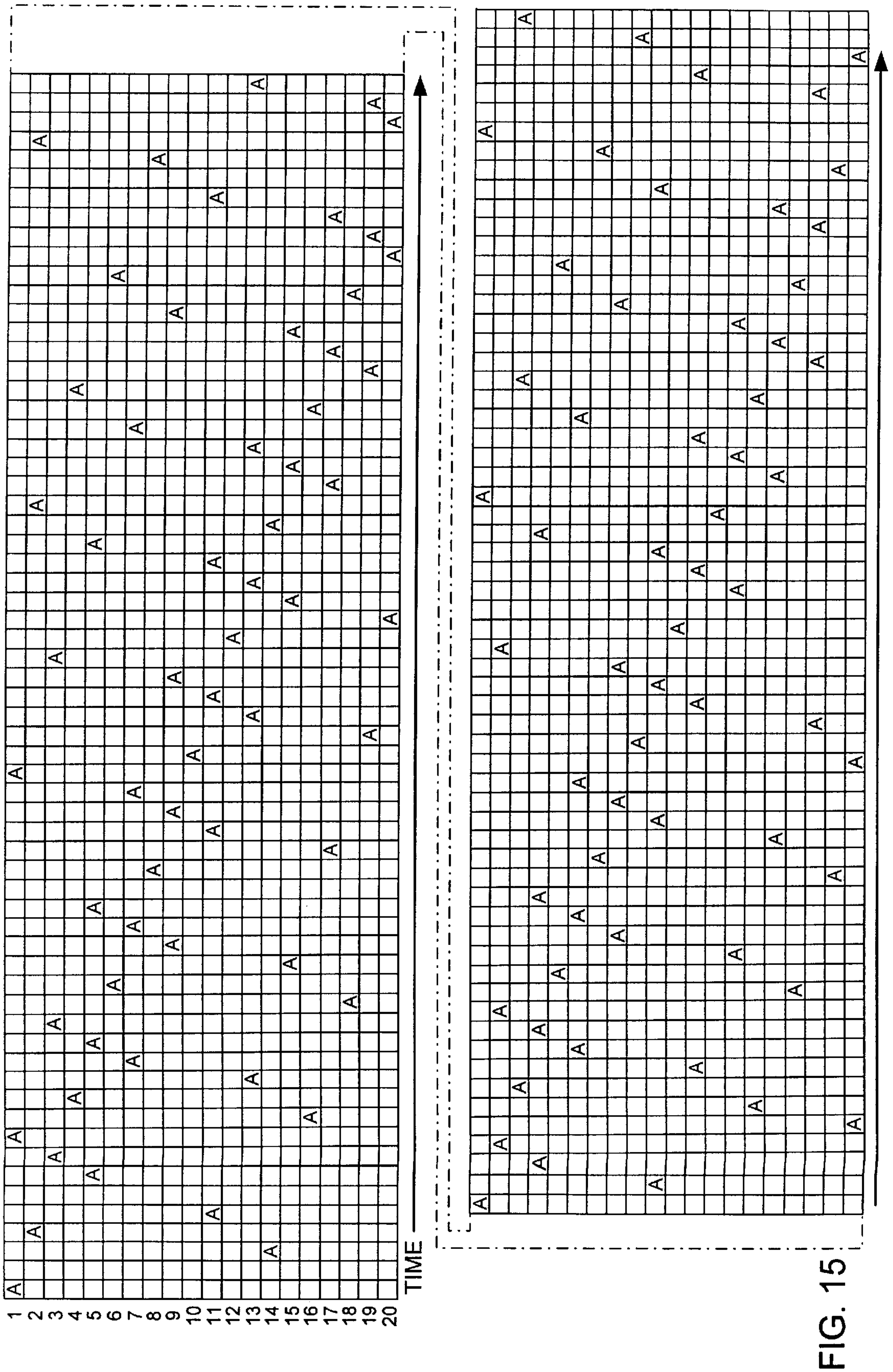

FIGS. 3, 4, and 5 are explanatory diagrams showing possible waveforms used in such an addressing arrangement and illustrating temporal dither (TD) and spatial dither (SD) techniques;

FIG. 6 is a table showing the grey levels obtainable using a known addressing scheme;

FIG. 7 is a table illustrating the perceived errors at a transition between grey levels utilizing such an addressing scheme;

FIGS. 8, 9 and 10 are tables illustrating the perceived errors at a transition between grey levels utilizing several addressing schemes in a device in accordance with the invention;

FIGS. 11 to 14 are diagrammatic representations of further addressing schemes which may be used in devices in accordance with the invention; and FIG. 15 is a table illustrating the timing of switching over two frames in a further embodiment of the invention.

Figure 1:
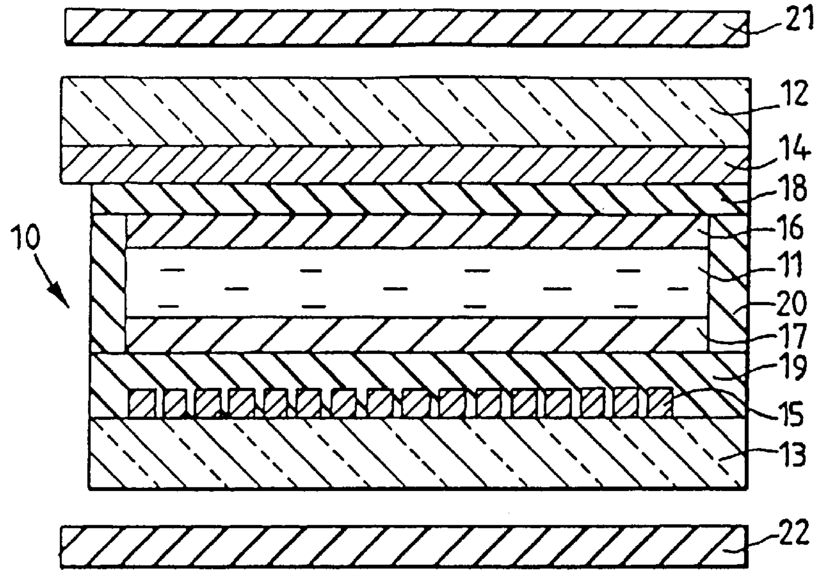
FIG. 1 is a diagrammatic section through a ferroelectric liquid crystal display panel.

Each of the embodiments to be described comprises a large ferroelectric liquid crystal display (FLCD) panel 10, shown diagrammatically in FIG. 1, comprising a layer 11 of ferroelectric liquid crystal material contained between two parallel glass substrates 12 and 13 bearing first and second electrode structures on their inside surfaces. The first and second electrode structures comprise respectively a series of column and row electrode tracks 14 and 15 which cross one another at right angles to form an addressable matrix of modulating elements (pixels). The electrode tracks may alternatively be arranged to form a polar coordinate (r, θ) matrix, a seven bar numeric matrix or some other x-y matrix. Furthermore alignment layers 16 and 17 are provided on insulating layers 18 and 19 applied on top of the row and column electrode tracks 14 and 15, so that the alignment layers 16 and 17 contact opposite sides of the ferroelectric liquid crystal layer 11 which is sealed at its edges by a sealing member 20. The panel 10 is disposed between polarisers 21 and 22 having polarising axes which are substantially perpendicular to one another. However it will be understood that such a FLCD constitutes only one type of light modulating device to which the invention is applicable, and the following description of such a display is therefore to be considered as being given only by way of non-limiting example.

As is well known, the elements or pixels at the intersections of the row and column electrode tracks of such a FLCD panel are addressable by the application of suitable strobe and data pulses to the row and column electrodes. One such addressing scheme, which can be used to discriminate between two states, such as black and white, is disclosed in "The Joers/Alvey Ferroelectric Multiplexing Scheme", Ferroelectrics 1991, Vol. 122, pages 63 to 79. Furthermore each pixel, or each subelement of each pixel where the pixel is sub-divided into two or more subelements, may have n different analogue grey states dependent on the voltage waveform applied to switch the pixel or subelement, so that, in addition to the black state and the white state referred to above, the pixel or subelement many have one or more intermediate grey states.

Figure 2:
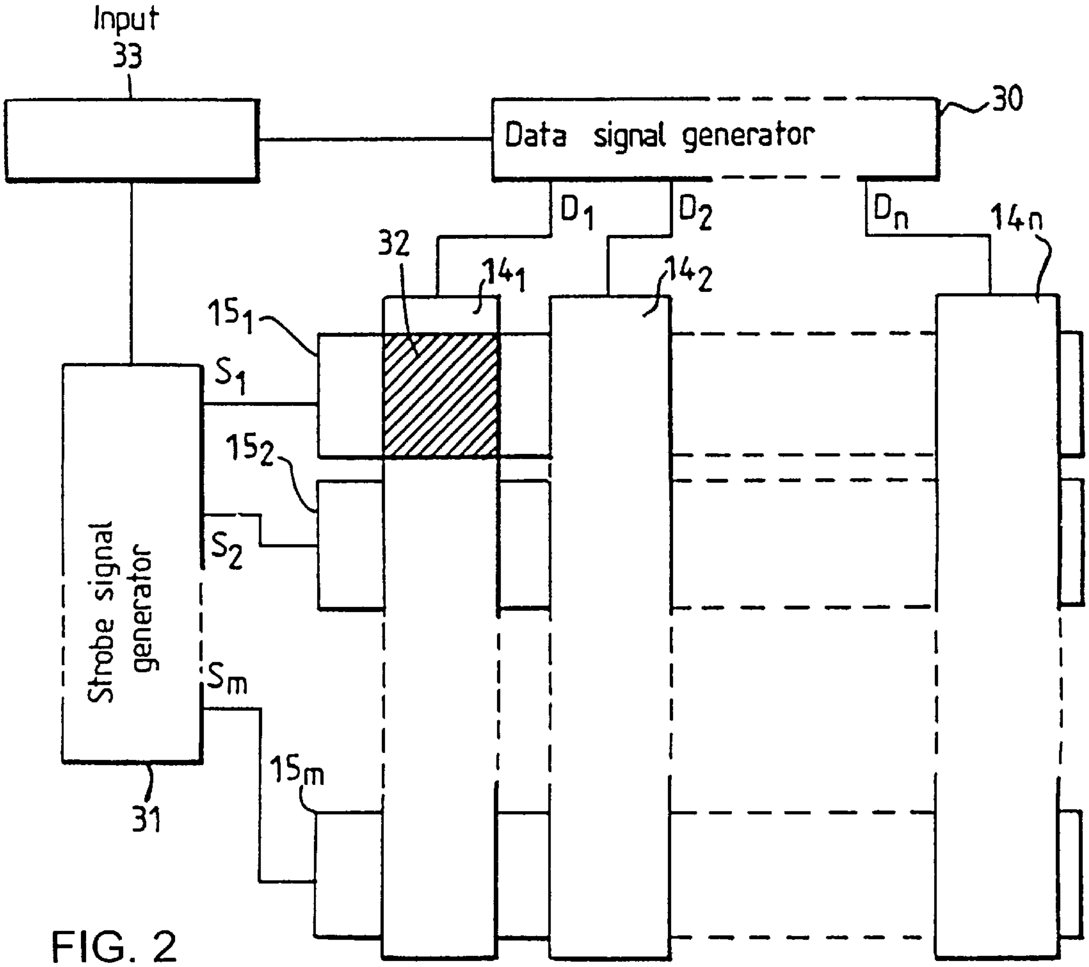
FIG. 2 is a schematic diagram of an addressing arrangement for such a panel.

FIG. 2 diagrammatically shows an addressing arrangement for such a display panel 10 comprising a data signal generator 30 coupled to the column electrode tracks $\mathbf{14}_1$, $\mathbf{14}_2$, . . . $\mathbf{14}_n$ and a strobe signal generator 31 coupled to the row electrode tracks $\mathbf{15}_1$, $\mathbf{15}_2$, . . . $\mathbf{15}_m$. The addressable pixels 32 formed at the intersections of the row and column electrode tracks are addressed by data signals $D_1$, $D_2$, . . . $D_n$ supplied by the data signal generator 30 in association with strobe signals $S_1$, $S_2$, . . . $S_m$ supplied by the strobe signal generator 31 in known manner in response to appropriate image data supplied to the data signal generator 30 and clock signals supplied to the data and strobe signal generators 30 and 31 by a display input 33 which may incorporate spatial and/or temporal dither control circuitry for effecting spatial and/or temporal dither as referred to with reference to FIGS. 4 and 5 below.

The manner in which the waveforms of the data and strobe signals supplied to particular column and row electrode tracks may determine the switching state of a pixel will now be briefly described with reference to FIG. 3 by way of non-limiting example. FIG. 3 shows a typical strobe waveform 40 comprising a blanking pulse 41 of voltage $-V_b$ in a blanking period and a strobe pulse 42 of voltage $V_s$ in a select period of duration τ. FIG. 3 further shows a typical "off" data waveform 43 and a typical "on" data waveform 44 each comprising positive and negative pulses of voltage $V_d$ and $-V_d$. When the blanking pulse 41 is applied to the pixel, the pixel is switched to, or retained in, a predetermined state, that is either the normally black state or the normally white state, independent of the data voltage applied to the column electrode track (the particular state being dependent on whether white or black blanking is applied). During the select period, the strobe pulse 42 is applied in synchronism with either the "off" data waveform 43 or the "on" data waveform 44 so that the resultant voltage across the pixel determines the state of the pixel and hence the transmission level. When the "off" data waveform 43 is applied, the resultant voltage 45 across the pixel causes the pixel to remain in the same state, that is the state to which the pixel has previously been blanked by the blanking pulse 41, and, when the "on" data waveform 44 is applied, the resultant voltage 46 across the pixel causes the pixel to switch to the opposite state. Furthermore an intermediate data waveform 47, for example of the form shown in FIG. 3 having positive and negative pulses of voltage $V_c$ and $-V_c$ may be applied to the pixel producing a resultant voltage 48 across the pixel which causes the pixel to assume an intermediate state corresponding to an intermediate analogue grey level.

Reference will now be made to FIGS. 4 and 5 to explain possible temporal and spatial dither techniques which may be used in the addressing arrangement to obtain perceived digital grey levels. FIG. 4 illustrates a temporal dither (TD) technique in which the timing of three strobe signals 53, 54 and 55 applied to a particular row electrode track during a frame time defines three select periods 50, 51 and 52 of durations in the ratio 1:4:8, for example, in which the pixel can be switched to the black state, the white state or any intermediate analogue grey state as described with reference to FIG. 3 above. The perceived overall grey level within the frame is the average of the transmission levels within the three temporal bits defined by the select periods 50, 51 and 52.

FIG. 5 illustrates a spatial dither (SD) technique given by way of non-limiting example in which each pixel comprises two subpixels 56 and 57 formed, for example, by the crossing points of two column subelectrode tracks $\mathbf{14}_{1a}$, $\mathbf{14}_{1b}$, with the row electrode track $\mathbf{15}_1$. Data signals $D_{1a}$, $D_{1b}$ are independently applied to the subelectrode tracks $\mathbf{14}_{1a}$, $\mathbf{14}_{1b}$ to independently control the transmission levels of the two subpixels constituting two spatial bits, and the average of the transmission levels of the two subpixels and the ratios of the areas of the subpixels determine the overall transmission level of the total pixel.

Of course each pixel may be sub-divided into any required number of subpixels or bits which may be separately addressable by spatial dither signals so that the overall transmission level of the pixel corresponds to the spatial average of the transmission levels of the subpixels, taking into account the relative areas of the subpixels. As is well known a colour pixel of a colour display device generally comprises three subpixels, that is a red subpixel, a green subpixel and a blue subpixel, which are controllable by separate subelectrodes to enable the full range of colours to be displayed. It will be appreciated that, when SD is applied to such a colour pixel, each of the colour subpixels is itself subdivided into two or more subelements to which separate spatial dither signals can be supplied by corresponding subelectrodes so as to allow for a range of transmission levels for each colour. Alternatively or additionally TD may be applied to each colour subpixel so that each colour subpixel is addressed within two or more sub-frames by temporal dither signals which may be varied to produce a range of transmission levels. Thus, where reference is made to "pixels" in this description, it should be understood that this may either be an individual pixel of a non-colour display device or an individual colour subpixel of a colour display device.

As previously indicated, FIG. 6 shows the eight linearly spaced grey levels obtainable by three digital bits binary weighted in the ratio 4:2:1, that is either a TD arrangement having three temporal bits of durations in the ratio 4:2:1 or a SD arrangement having three spatial bits with surface areas in the ratio 4:2:1. Considering the TD arrangement, each addressing frame may be considered to consist of seven subframes of equal duration in a sequence of three groups of subframes, that is a first group consisting of a single subframe corresponding to the first temporal bit, a second group consisting of two subframes corresponding to the second temporal bit, and a third group consisting of four subframes corresponding to the third temporal bit. The table of FIG. 6 shows the state of each of the three bits required to obtain each desired grey level. Thus, for example, the grey level 3 is obtained with the single subframe of the first bit in the state 1 giving a first bit of 1, the two subframes of the second bit each in the state 1 giving a second bit of 1+1=2, and the four subframes of the third bit each in the state 0 giving a third bit of 0+0+0+0=0. Furthermore the grey level 4 is obtained with the single subframe of the first bit in the state 0 giving a first bit of 0, the two subframes of the second bit each in the state 0 giving a second bit of 0+0=0, and the four subframes of the third bit each in the state 1 giving a third bit of 1+1+1+1=4. The duration of the subframes is sufficiently fast, e.g. 50 Hz, that any differences in transmission level within the subframes are not normally perceivable.

FIG. 7 shows, on a line A, the desired grey levels in a sequence of frames in which the first three frames display the grey level 3 and the last four frames display the grey level 4. Line B shows the ordering of the three temporal bits of each frame in the ratio 1:2:4, and line C shows the state of each of the seven subframes corresponding to the three bits which determine the grey level of each frame, showing in particular the three subframes of the first two bits in the state 1 for the grey level 3, and the four subframes of the third bit in the state 1 for the grey level 4. Line D shows the temporal variation of the actual grey level displayed on a subframe by subframe basis, corresponding to the average of the states of the seven preceding subframes, and it will be noted that, in the first frame following the desired transition from the grey level 3 to the grey level 4, the average transmission level of the preceding seven subframes has the values 2, 1, 0, 2 and 3 in successive subframes before reaching the value 4 in the final sub-frame of the frame. Line E shows the perceived error for each frame, that is the average transmission level of the seven subframes of the frame expressed as a percentage of the desired grey level of the frame. Normally this percentage is 100%, but, in the first frame following the desired transition from the grey level 3 to the grey level 4 the percentage will be (2+1+0+1+2+3+4)100/(4×7)~46%.

Thus it will be appreciated that, at the transition from the grey level 3 to the grey level 4, there is an unwanted drop in the transmission level from the desired grey level 3 to a worst case of an average transmission level of (3+2+1+0+1+2+3)/7~1.7 over seven successive subframes, before gradually rising to the desired grey level of 4 by the end of that frame. It will be appreciated that this drop in the perceived transmission level averaged over seven subframes takes place over almost two frames before the desired level is reached, and such a drop in transmission level over this period is perceptible to the human eye, its most dramatic effect occurring when large areas of grey level 4 sweep over areas of grey level 3 on a display since this will be observed as an edge of lower intensity between the areas of grey level 4 and the areas of grey level 3. The human eye and brain are very receptive to such edges, and it is likely that they would be perceived even for fractions of a frame time.

In an embodiment of FLCD panel according to the invention such a TD addressing arrangement is used except the ordering of the temporal bits is changed between successive addressing frames and also between adjacent addressing lines so that, for example, the temporal bits of a first frame are in a first order 1:2:4, whereas the bits of a second frame are in a second order 4:2:1, the bits of the next frame being in the order 1:2:4 and so on with these sequences alternating in successive frames. Furthermore the sequences are also alternated between adjacent lines so that, where the bits of a frame on line n are in the order 1:2:4, the bits of the corresponding frame on each of the lines n+1 and n−1 are in the order 4:2:1. This is shown in FIG. 8 indicating, as in FIG. 7, the transition from the desired grey level 3 to the desired grey level 4 and showing, on line B, the alternating sequences 1:2:4 and 4:2:1 of the bits, firstly on line n and then on the lines n+1 and n−1 immediately adjacent the line n. It will be seen that each sequence of 1:2:4, for example, is not only preceded and followed by the other sequence 4:2:1 along a line but is also preceded and followed by such a sequence on adjacent lines. As before line C shows the state of each subframe in successive frames, and line D shows the average transmission level of the states of the seven preceding subframes.

In this case the average transmission level varies on a cyclic basis between successive frames even when the desired grey level remains unchanged. As shown on line E the perceived error, that is the average transmission level of the seven subframes of the addressed frame expressed as a percentage of the desired grey level, alternates between 43% and 157% for the desired grey level 3 depending on the sequence of bits in the frame, whereas the perceived error alternates between 57% and 143% for the desired grey level 4. Furthermore, in the first frame following the desired transition from the grey level 3 to the grey level 4, the perceived error is 89% regardless of whether the sequence of bits in that frame is 1:2:4 or 4:2:1, this perceived error being intermediate the perceived errors of the preceding and following frames, that is between 157% and 57% or between 43% and 143%.

FIG. 8 also shows on line F the average transmission level of each subframe over two adjacent lines, for example lines n and n+1, and it will be seen that the variation in the transmission level of each subframe along a line is compensated by the variation in the transmission level along the adjacent line so that the average value remains at 3 until after the desired transition from the grey level 3 to the grey level 4 when the average value then becomes 4. It will be noted that there is a delay of three subframes following the desired transition from the grey level 3 to the grey level 4 before the average of the two subframes changes from 3 to 4. However this delay is too short to be perceivable and the averaging over adjacent lines is such as to effectively remove all perceivable edge effects referred to in the description with reference to FIG. 7.

Whilst such a technique suffers from the disadvantage that a constant grey level applied over a number of successive frames along a line will result in an oscillation of approximately ±60% change in transmission level with a period of two frames, such variation in the transmission level will not be noticeable in most applications because the effect is counterbalanced on average between adjacent lines due to the phase difference in the changing temporal bit sequences.

A further embodiment of FLCD panel according to the invention will now be described with reference to FIG. 9 which provides a compromise between the oscillatory change in transmission level and the perceived error at the desired transition between two grey levels, which might give rise to edge effects as discussed above. In this embodiment a similar TD addressing arrangement is used with the sequences of bits being alternated between successive frames and also between adjacent lines, except that in this case the most significant bit is intermediate the other two bits in each of the two alternate sequences, these sequences being 1:4:2 and 2:4:1. The effect of applying these two sequences to adjacent lines n and n+1 is shown in FIG. 9 for a desired transition from the grey level 3 to the grey level 4, the state of each subframe being shown on line C for each line and the average of the preceding seven subframes being shown on line D. In this case, as shown on line E for each line, the perceived error for a desired constant grey level is less than in the embodiment of FIG. 8, varying between 81% and 119% for the grey level 3 and between 86% and 114% for the grey level 4. Furthermore, in the first frame following the transition from the grey level 3 to the grey level 4, the perceived error is 89% which is between the perceived errors of the preceding and following frames, that is between 81% and 114% or between 119% and 86%. On the other hand, if the average of the transmission level over the two lines is considered, there is a slight dip in the perceived level followed by a slight rise in the perceived level, each occurring over less than half a frame, as shown on line F. Line G in FIG. 9 shows the average over seven preceding subframes of this average transmission level between two lines, this average being shown over two frames following the transition of the desired grey level from 3 to 4, and it will be appreciated from this that such averaging will be such as to virtually eliminate any perceived edge effects.

However, in either of the above described embodiments, there will always be certain patterns of grey level transmission occurring in space and time which might be expected to give rise to a noticeable error in the actual grey levels displayed. The worst case would be expected to occur for a change in grey level on line n which is matched by opposite changes in grey level on adjacent lines n+1 and n−1, this being shown for a transition in grey level from 3 to 4 on line n and a transition in grey level from 4 to three 3 on lines n+1 and n−1 in FIG. 10, where the two bit sequences are 1:2:4 and 4:2:1 as in FIG. 8. In this case the perceived errors in the grey levels displayed do not average out over adjacent lines, and there is an error produced where horizontal changes in grey level involve the most significant bit (4). However, in such cases, temporal averaging will reduce the effect of errors, particularly where the frame rate is fast. Any errors would be expected to be particularly noticeable for fast diagonal movement where consecutive frames incorporate grey level changes involving certain grey scale sequences. The effect may also be significant at the corners of a moving area of grey, although this is likely to be less noticeable since the previously discussed edge effects will not be produced.

In a further embodiment of FLCD panel according to the invention a TD addressing arrangement is used in which the temporal bits of each frame are addressed in a first order 1:2:4 along one line, and the temporal bits of each frame are addressed in a second order 4:2:1 along another, adjacent line, as shown diagrammatically in FIG. 11. It will be appreciated that, in this case, the bits of corresponding frames on the two lines are addressed in different orders, that is 1:2:4 and 4:2:1 respectively. Thus the variation in the order of addressing of the bits of the frames varies spatially in this embodiment, rather than temporally. Whilst such an embodiment is not as efficient in reducing perceived errors causing pseudo-edge effects as the embodiments previously described, it nevertheless results in some reduction in such edge effects due to the different ordering of addressing of adjacent lines, and moreover can be effected with relatively straightforward addressing circuitry since, along each line, the bits are addressed in the same order within each frame.

In a further embodiment of FLCD panel according to the invention a TD addressing arrangement is used in which the order in which the temporal bits are addressed is changed on a random basis between addressing frames and adjacent addressing lines so that, for example, the temporal bits of some frames are addressed in a first order 1:2:4 and the temporal bits of other frames are addressed in a second order 4:2:1, as shown diagrammatically in FIG. 12. Such a random change in the addressing of the temporal bits between adjacent frames and lines may be controlled on a truly random basis, for example, using a random number generator, or may be controlled on a pseudo-random basis such that there is apparently no regular pattern of change over a large time period. Because of the random basis of the change in the order in which the bits are addressed, such an embodiment would be particularly effective in reducing pseudo-edge effects over large areas even though it would inevitably give rise to perceived errors in all images displayed.

FIG. 15 diagrammatically shows a possible TD addressing arrangement for a FLCD panel having twenty rows. In the diagram the twenty rows are numbered consecutively from 1 to 20 along the vertical axis with the addressing of the rows over two frame periods being shown along the horizontal axis (the time axis). The addressing points along each row are indicated by the symbol "A", and each row is addressed in alternate frames with TD ratios of approximately 1:2:4 and 4:2:1 respectively. Thus, considering the first row 1, the temporal bits are addressed in a first order 1:2:4 in a first frame beginning at the extreme left of the diagram, and the temporal bits are then addressed in a second order 4:2:1 in a second frame immediately following the first frame.

Furthermore, considering any one of these rows, which may be denoted row n, it will be noted that the order in which the rows are addressed alternates between adjacent rows. Thus, if row n is initially addressed in the first order 1:2:4, it follows that each of rows n+1 and n−1 will initially be addressed in the second order 4:2:1. This corresponds to the arrangement described with reference to FIG. 8.

It should further be noted that only one row is addressed in any single time slot in this addressing scheme. In the particular case illustrated, row 1 is addressed in the first time slot, row 14 is addressed in the third time slot, row 2 is addressed in the fourth time slot, row 11 is addressed in the fifth time slot, etc. (no row being addressed in the second time slot). The corresponding data for the current TD bit of the row being addressed is timed to correspond with the addressing point "A". In a practical device, the TD ratios are compromised to some extent by the number of lines being addressed. Hence, in the example shown of a twenty row display, the TD ratio for the first frame is actually 7:19:37 and the TD ratio for the second frame is actually 37:19:7. The higher the number of row in the display, the more accurate it is possible to make the TD ratios.

The above described embodiments are concerned with arrangements in which the grey level is produced by TD only. However it will be appreciated that other addressing arrangements which may be used in devices according to the invention may incorporate SD and TD used in combination. In such a combined arrangement, it is advantageous to arrange for the addressing of the most significant spatial bit on each line to be out of phase with the addressing of the most significant spatial bit on the adjacent lines, as well as for the addressing of the most significant spatial bit to be out of phase with the addressing of the least significant spatial bit on the same line. In this manner the grey level oscillations can be reduced to a minimum.

It will also be appreciated that the particular numbers of bits and their ratios in the embodiments described above are given only by way of example, and that, in further embodiments of the invention, similar addressing schemes may be used with different bit ratios, such as 1:3:12, and different numbers of bits.

In a still further embodiment the order in which the temporal bits are addressed for a particular grey level in a particular frame may be determined in dependence on the immediately preceding frame or frames and/or on the immediately following frame or frames in order to minimise the perceived error at the transitions between grey levels or over a period of time.

It will be appreciated that, whether the addressing order is determined by such a dynamic feedback process or is predetermined as in the previously described embodiments, it is possible for any suitable sequence of addressing to be adopted taking into account the required bit ratios. FIGS. 13 and 14 show the further embodiments utilising TD 1:4:16:64 and SD 1:2 in combination. In each case the addressing orders are changed according to a prescribed sequence.

What is claimed is:

1. A light modulating device comprising an addressable matrix of modulating elements, and addressing means for selectively addressing each element in a series of addressing frames in order to vary the transmission level of each element relative to the transmission levels of the other elements, the addressing means including temporal dither means for addressing at least part of each element within each frame with different combinations of temporal dither signals applied to separately addressable temporal bits within the frame to produce different transmission levels, wherein the temporal dither means is arranged to address the temporal bits in a first order in a first frame or in a first spatial location and in a second order, which is different to the first order, in a second frame or in a second spatial location.

2. A light modulating device according to claim 1, wherein the addressing means is arranged to address the matrix of elements line by line, and the temporal dither means is arranged to address the temporal bits of corresponding frames along two adjacent lines such that the bits are addressed in one order in the frame on one of the lines and in another order in the frame on the other line.

3. A light modulating device according to claim 2, wherein the temporal dither means is arranged to address the temporal bits in each frame along said one line in the first order and to address the temporal bits in each frame along said other line in the second order.

4. A light modulating device according to claim 2, wherein the temporal dither means is arranged to address the temporal bits in each frame along each line in either the first order or the second order, these orders varying according to a prescribed sequence, including alternating between successive frames, along each line and/or between corresponding frames on adjacent lines.

5. A light modulating device according to claim 1, wherein the addressing means is arranged to address the temporal bits in each frame in an order which varies randomly or pseudo-randomly from frame to frame.

6. A light modulating device according to claim 1, wherein the first order begins with the least significant temporal bit and ends with the most significant temporal bit, and the second order begins with the most significant temporal bit and ends with the least significant temporal bit.

7. A light modulating device according to claim 1, wherein the first order and the second order are both sequences of three or more bits in which a most significant temporal bit occupies a position intermediate the beginning and the end of the sequence.

8. A light modulating device according to claim 7, wherein the first order begins with a least significant temporal bit and ends with a next least significant temporal bit, and the second order begins with the next least significant temporal bit and ends with the least significant temporal bit, the most significant temporal bit occupying an intermediate position in both orders.

9. A light modulating device according to claim 1, wherein the addressing means further includes spatial dither means for addressing separately addressable spatial bits of each element of different sizes with different combinations of spatial dither signals.

10. A light modulating device according to claim 9, wherein the addressing means is arranged to address the matrix of elements line by line, and the temporal dither means is arranged to address a most significant spatial bits on adjacent lines out of phase with one another.

11. A light modulating device according to claim 9, wherein the temporal dither means is arranged to address a least significant spatial bit and the most significant spatial bit out of phase with one another.

* * * * *